United States Patent Office 3,428,691
Patented Feb. 18, 1969

3,428,691
AGE RESISTORS FOR RUBBER
Ronald B. Spacht, Kent, Ohio, assignor to The Goodyear Tire & Rubber Company, Akron, Ohio, a corporation of Ohio
No Drawing. Filed Dec. 21, 1964, Ser. No. 420,177
U.S. Cl. 260—613          5 Claims
Int. Cl. C08d 11/04; C07c 43/22; C08c 13/08

This invention relates to age resistors for oxidizable organic materials, their preparation and use in the stabilization of organic materials such as rubber, gasoline, oils, etc. which normally tend to deteriorate when exposed to normal atmospheric conditions and in particular when exposed to sunlight and/or elevated temperatures in the presence of air or oxygen.

Rubber, both natural and synthetic, has proven to be one of the most difficult organic materials to successfully stabilize against the deleterious effects of oxygen and ozone. Both cured and uncured natural and synthetic elastomers are susceptible to the deleterious effects that are found in normal atmospheric conditions, and although many materials have been suggested and used as rubber stabilizers, no completely satisfactory material has been found that will fully protect rubber under the widely different conditions to which it is subjected. The search for new and better rubber stabilizers is therefore a problem which continues to command the attention of many skilled investigators.

Phenolic compounds have been among the more commonly used class of compounds that have found wide scale acceptance as rubber stabilizers, but many of the phenolic antioxidants, although reasonably effective stabilizers for organic materials tend to impart discoloration and staining to the materials they are intended to stabilize. An additional problem that is not successfully solved by many of the previously known phenolic stabilizers is that they are in varying degrees susceptible to being too readily volatilized, and therefore escape from the materials which they are intended to stabilize during the rather extended service life to which such materials are subjected.

It is therefore an object of this invention to provide a new class of phenolic antioxidants. Another object of this invention is to provide a new class of stabilizers for organic compounds that are relatively non-discoloring and non-volatile.

In accordance with the present invention it has been found that exceptionally effective stabilizers for organic materials are compounds which conform to the following structural formula:

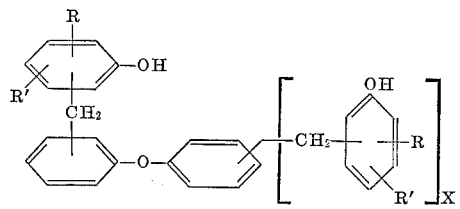

wherein X is an integer from 0 to 2, R is selected from the group consisting of hydrogen, alkyl radicals having from 1 to 8 carbon atoms, cycloalkyl radicals having from 5 to 8 carbon atoms and alkoxy radicals having from 1 to 8 carbon atoms, and R' is selected from the group consisting of tertiary alkyl radicals having from 4 to 8 carbon atoms and cycloalkyl radicals having from 5 to 8 carbon atoms.

Preferred compounds conforming to the above structural formula are those in which at least one of the R and R' groups are selected from tertiary alkyl radicals having from 4 to 8 carbon atoms and are located ortho to the phenolic OH radical. The most highly preferred compounds are:

4,4′ bis(4-hydroxy-3,5-ditertiarybutyl benzyl)diphenyl ether
2,4,4′ tris(4-hydroxy-3,5 ditertiary butyl benzyl)diphenyl ether
4,4′ bis(2-hydroxy-3-tertiarybutyl-5-methyl benzyl) diphenyl ether
2,4,4′ tris(2-hydroxy-3-tertiarybutyl-5-methyl benzyl) diphenyl ether The compounds of this invention may be prepared by reacting a mono, di or trihalo methylated diphenyl oxide or a mixture of these with a mono or dihydric phenolic compound having at least one ortho or para position free. The substituents on the phenolic compound are preferably selected from the group consisting of hydrogen, methyl, ethyl, isopropyl, t-butyl, chloro and methoxy. The preferred diphenyl oxides are selected from the group consisting of di or trichloro methylated diphenyl oxide.

Representative examples of suitable phenolic compounds that may be reacted with the above class of diphenyl oxides are:

phenol
o,m,p-cresol
the xylenols
hydroquinone
resorcinol
catechol
o,m,p-isopropyl phenols
o,m,p-tertiary butyl phenols
2-tert. butyl-4-methyl phenol
2,6 ditertiary butyl phenol
o,m,p-ethyl phenols
o,m,p-chlorophenol
o,m,p-methoxy phenol Preferred compounds of the present invention are prepared by reacting the described diphenyl oxides with phenol or para cresol, then further alkylating with a tertiary olefin.

The reaction between the described class of diphenyl oxides and phenolic compounds proceeds quite easily at only moderately elevated temperatures in the range of 30 to 150° C., with preferred temperature limits being 50 to 100° C. However, the reaction will be somewhat accelerated by the employment of a suitable Friedel-Craft type catalyst such as $AlCl_3$, $ZnCl_2$, $FeCl_3$, $Al_2O_3$, ZnO, Zn, Al and Fe. This reaction is preferably carried out in the presence of an excess of the phenolic compound, in general it will be found advantageous to employ approximately a 100% excess of the phenolic compound, if less than 50% excess phenolic compound is used it will be advantageous to employ an inert hydrocarbon solvent. The inert hydrocarbon solvents should have a boiling point range from 60 to 150° C. Examples of suitable inert hydrocarbon solvents include toluene, hexane and benzene. The resulting reaction product obtained by the above described reaction between a diphenyl oxide and phenolic compound is then further reacted with a tertiary olefinic material having from 4 to 8 carbon atoms, such as isobutylene, which readily substitutes on the phenolic ring predominantly in either the ortho or para position i.e., in the two stage process the original phenolic reactant should therefore have at least two free positions from the ortho and parapositions. The reaction with isobutylene is effectively catalyzed by employing one or more of the customary acidic alkylation catalysts such as sulfuric acid, benzene sulfonic acid, toluene sulfonic acid, acid activated clays, boron trifluoride, zinc chloride, ferrous and ferric halides, aluminum halides and the stannous and stannic halides. Sulfuric acid, benzene sulfonic acid, toluene sulfonic acid and acid activated clay are preferred catalysts for the second step of the disclosed process. The catalysts employed in both the first and second stages of the disclosed process are employed in the customary catalytic amounts, which will normally vary from 0.1 percent to 5.0 percent of catalyst based on the weight of the reactants in the reaction which is to be catalyzed.

The general procedure to be observed in carrying out the second stage of the process to produce the compounds of the present invention involves the following steps. The reaction product from stage one wherein a diphenyl oxide of the class described above is reacted with a suitable phenolic compound is stripped of unreacted phenol by heating under vacuum at about 190° C. pot temperature at 20 to 40 millimeters of mercury. The stage one reaction product is then dissolved in from 50 to 100 percent by weight of a suitable hydrocarbon solvent such as used in stage one, the acid catalyst added and the alkylation reaction carried out between 30 and 100° C. until no further reaction takes place. The amount of olefinic material employed will depend upon what phenols are used as starting materials and also upon what chloromethylated diphenyl ether is used. The catalyst is neutralized with a base, preferably sodium carbonate in aqueous solution, the mixture is then digested, the water layer is allowed to settle and is then drawn off. The volatiles are then removed by heating under vacuum.

In preparing compounds of the present invention the phenolic material will normally be reacted in the ratio of at least one mol of phenolic compound, for each replaceable chlorine atom in the chloromethylated diphenyl oxide used as an initial reactant. In carrying out the second stage of the above described reaction the olefinic material such as isobutylene will normally be reacted with the ratio of from one to two mols of olefinic compound for each phenolic group that has been attached to the central diphenyl oxide nucleus.

While the procedure described above which may be conveniently referred to as a two stage process is preferred for preparing the products of the present invention they may also be prepared by a one stage process. The one stage process is carried out by reacting a mono, di or tri-halo methylated diphenyl oxide with a phenolic compound having the following structural formula:

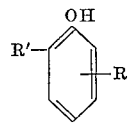

wherein R is selected from the group consisting of hydrogen, alkyl radicals having from 1 to 8 carbon atoms, cycloalkyl radicals having from 5 to 8 carbon atoms and alkoxy radicals having from 1 to 8 carbon atoms and wherein R' is selected from the group consisting of tertiary alkyl radicals having from 4 to 8 carbon atom and cycloalkyl radicals having from 5 to 8 carbon atoms. This one stage process proceeds readily at moderately elevated temperatures in the range of 30 to 150° C. This reaction may be accelerated by employment of a suitable Friedel-Craft type catalyst such as described above in connection with stage one of the two stage process.

The following specific examples demonstrate the preparation of compounds conforming to the present invention but are not to be interpreted as limiting the scope thereof.

EXAMPLE 1

Preparation of butylated reaction product of p-cresol and dichloromethylated diphenyl oxide Two hundred and sixteen grams of p-cresol and 126 grams of dichlormethylated diphenyl oxide were mixed together and warmed to 40° C. and allowed to react for 8 hours. The reaction mixture was heated to 170° C. under a pressure of 20 millimeters to remove the excess p-cresol. The reaction product weighed 183 grams.

One hundred and twenty-seven grams of the reaction product was dispersed in 200 milliters of toluene and 8 grams of toluene sulfonic acid were placed in a flask and warmed to 65° C. Isobutylene was added slowly between 65 and 90° C. over a 3½ hour period. The catalyst was then neutralized with 25 percent $Na_2CO_3$. The neutralized catalyst was removed by decantation and washing. The reaction product was finally heated to 190° C. at 30 millimeters to remove volatile products. Weight of final product was 156 grams.

EXAMPLE 2

Three hundred and twenty-four grams of p-cresol and 158 grams of trichloromethylated diphenyl oxide were mixed and allowed to react to 40 to 45° C. for 6 hours. The reaction mixture was then heated to 160° C. at 20 millimeters to remove the excess p-cresol. Two hundred and fifty-four grams of reaction product were obtained.

Two hundred and four grams of this reaction product were dissolved in 200 milliliters of toluene and 12 grams of toluene sulfonic acid added. The whole mixture was heated to 62° C. and then isobutene added with vigorous stirring. The reaction took 3 hours. The catalyst was destroyed and removed as in Example 1. The reaction product was then heated to 200° C. at 25 millimeters to remove volatiles. Final product obtained weighed 271 grams.

EXAMPLE 3

Reaction product of 2,6-ditertiary butyl phenol with dichloromethylated diphenyl oxide One hundred and three grams of 2,6 ditertiary butyl phenol were dissolved in 100 milliliters of toluene. Then 67 grams of dichloromethylated diphenyl oxide were added and the whole allowed to react between 32 and 45° C. for 72 hours. The mixture was then washed with $H_2O$ to remove the HCl dissolved in the toluene. A second wash with dilute $Na_2CO_3$ was carried out before heating to 185° C. at 30 millimeters to remove toluene and other volatiles. Weight of product was 126 grams.

EXAMPLE 4

Reaction product of 2-tertiary butyl p-cresol with dichloromethylated diphenyl oxide Eighty-two grams of 2-tertiary butyl-p-cresol, 67 grams of dichloromethylated diphenyloxide and 100 milliliters of toluene were mixed. The mixture was warmed between 40 and 55° C. for 5 hours. Then 0.5 gram of $ZnCl_2$ was added and the mixture heated to 75° C. to complete removal of HCl. A vacuum was pulled on the reaction flask to remove most of the HCl before adding aqueous $Na_2CO_3$ to destroy the catalyst. The reaction mixture was then heated to 140° C. at 40 millimeters to remove volatiles. Weight of product was 123.0 grams.

EXAMPLE 5

Butylated reaction product of p-cresol and dichloromethylated diphenyloxide

Twelve hundred and ninety-six grams of p-cresol were warmed to 40° C. and then 504 grams of dichloromethylated diphenyloxide were added between 40 and 53° C. in 1½ hours. The mixture was stirred at 50° C. for 6 more hours, then heated to 190° C. at 25 millimeters to remove the excess p-cresol. Product obtained weighed 738 grams.

EXAMPLE 6

Product of Example 5 was butylated as previously described using 800 milliliters of toluene as the solvent and 32 grams of toluene sulfonic acid as the catalyst. Final product obtained weighed 937 grams.

EXAMPLE 7

Butylated reaction product of phenol and dichloromethylated diphenyloxide

Eleven hundred and twenty-four grams of phenol and 534 grams of dichloromethylated diphenyloxide were reacted as in Example 1, the weight of product was 728 grams. This reaction product was then butylated following the procedure described in Example 1 employing 500 milliliters of toluene and 28 grams of toluene sulfonic acid as a catalyst. The final product weighed 1153 grams.

EXAMPLE 8

Butylated reaction product of meta-paracresol and dichloromethylated diphenyloxide Twelve hundred and ninety-six grams of m-p-cresol and 534 grams of dichlormethylated diphenyloxide were reacted as in Example 1. Seven hundred and eighty-five grams of reaction product were obtained.

The above product was butylated using 500 milliliters of toluene as the solvent and 32 grams of toluene sulfonic acid as the catalyst. Yield of the final product was 1007 grams.

EXAMPLE 9

One hundred and eighty-eight grams of phenol (2 mols) were dispersed in 400 milliliters of toluene and 0.5 gram of zinc dust added. These materials were heated to 100° C. and 267 grams of dichloromethylated diphenyl oxide introduced to the reaction vessel over a two hour period. Sixteen grams of toluene sulfonic acid were then added to the reaction vessel to catalyze the second state of the reaction. Isobutylene was introduced to the reactants over a two hour period and reacted at 60 to 100° C. until no further reaction would take place. The catalyst was neutralized with 40 grams of a 25 percent $Na_2CO_3$ aqueous solution. The reaction mixture was digested then allowed to settle and the water layer removed by decanting. Volatiles were removed by heating to 150° C. at 50 millimeters of mercury. The resulting product weighed 663 grams.

EXAMPLE 10

Three hundred and seventy-six grams of phenol (4 mols) and 0.5 grams of zinc dust were dispersed and heated to 100° C. Two hundred and ten grams of trichlormethylated diphenyloxide were added slowly over a one hour period during which the temperature was maintained at 95 to 105° C. The reaction mixture was then maintained at 100° C. for an additional one-half hour. Excess phenol was then stripped from the reaction mixture at 190° C. and 15 millimeters of mercury. The resinous residue weighed 301 grams. The entire 301 grams of residue was dissolved in 300 milliliters of toluene and 12.0 grams of anhydrous toluene sulfonic acid added. The temperature of the reactants was adjusted to 60° C. and isobutylene introduced to the reaction vessel with vigorous agitation for approximately two hours while the reactants were maintained at a temperature of 60 to 96° C. The catalyst was then neutralized with 12.0 grams of an aqueous $Na_2CO_3$ solution. The reaction mixture was digested and the water layer settled and separated by decanting. Volatiles were removed by heating to 190° C. at 20 millimeters of mercury. The resulting resinous product weighed 469 grams.

EXAMPLE 11

Four hundred and thirty-two grams of para cresol and 0.5 gram of zinc dust were dispersed and heated to 100° C. Two hundred and sixty-seven grams of dichlormethylated diphenyloxide were added slowly over a one hour period during which the temperature was maintained at 95 to 105° C. The reaction mixture was then maintained at 100° C. for an additional one-half hour. Excess p-cresol was then stripped from the reaction mixture at 190° C. and 15 millimeters of mercury. The resinous residue weighed 385 grams. It was dispersed in 300 milliliters of toluene and 12.0 grams of anhydrous toluene sulfonic acid added. The temperature of the reactants was adjusted to 60° C. and isobutylene introduced to the reaction vessel with vigorous agitation for approximately two hours while the reactants were maintained at a temperature of 60 to 95° C. The catalyst was then neutralized with 12.0 grams of an aqueous $Na_2CO_3$ solution. The reaction mixture was digested and the water layer settled and separated by decanting. Volatiles were removed by heating to 190° C. at 20 millimeters of mercury. The resulting resinous product weighed 494 grams.

EXAMPLE 12

Two hundred and fifty grams of para methoxy phenol (2 mols) and 178 grams of dichloromethylated diphenyloxide (0.67 mol) were mixed together and warmed gently at 80° C. The reaction was completed in three hours. The reaction mixture was then heated to 190° C. under 20 millimeters of mercury to remove volatiles. The resinous residue weighed 264.0 grams. It was dispersed in 250 milliliters of toluene and 10 grams of anhydrous toluene sulfonic acid added. The temperature of the reaction mixture was adjusted to 60° C. and isobutylene introduced while vigorously agitating the mixture. The reaction was completed in two and one-half hours and the catalyst neutralized with aqueous $Na_2CO_3$. The mixture was digested and the water layer allowed to settle to permit separation by decantation. The volatiles were removed by heating to 200° C. at 35 millimeters of mercury. The product weighed 311 grams.

The compounds of this invention are useful in protecting raw rubber in latex form, coagulated rubber and vulcanized rubber. They are highly efficient and are capable of being employed in relatively small amounts to effectively stabilize the rubbers into which they are incorporated. The precise amount of these highly effective stabilizers which is to be employed will depend somewhat on the nature of the rubber and the severity of the deteriorating conditions to which the rubber is to be exposed. It has been found that an effective antioxidant amount of the disclosed stabilizers will generally range from 0.05 to 5.0 percent by weight based on the weight of the rubber, although it is commonly preferred to use from 0.5 to 2.0 percent by weight based on the weight of the rubber. The effective proportions may also be defined as ranging from approximately 0.05 to 5.0 parts by weight per 100 parts by weight of rubber.

The rubbers that may be conveniently protected by diphenyl ethers in accordance with this invention are cured and uncured oxidizable rubbery polymers such as natural rubber and those synthetic oxidizable rubbery polymers which are normally susceptible to deterioration by sunlight and atmospheric oxygen. By the term "oxidizable rubbery polymers" as employed in this application is meant natural rubber, the synthetic rubbery polymers and copolymers of conjugated dienes and the polymeric olefins. Representative examples of synthetic oxidizable rubbery polymers which are normally susceptible to deterioration by sunlight and atmospheric oxygen include polychloroprene; polyisoprenes and polybutadienes, and in particular, polyisoprenes and polybutadienes having essentially all of their monomer units combined in a cis-1,4 structure; the rubbery copolymers of butadiene and styrene which contain from 50 to 90 percent or more of butadiene; and butyl rubber which is a polymerization product of a major proportion of a mono-olefin and a miner proportion of a multi-olefin such as butadiene or isoprene; polyolefins containing little or no unsaturation, such as polyethylene, polypropylene, ethylene propylene and terpolymers of ethylene propylene.

The stabilizing effectiveness of the compositions of this invention in rubber was evaluated by conducting oxygen absorption tests at 90° C. on a sample of SBR 1006, a hot process polymer containing approximately 25 parts of bound styrene and 75 bound parts of butadiene.

The oxygen absorption tests were conducted by dissolving in benzene portions of the SBR polymer containing one part per 100 parts of rubbery polymer of various antioxidant compositions of this invention. The cements so formed were poured onto aluminum foil so as to form a thin film. After drying the weight of rubber was obtained in connection with each sample. Thereafter the foil with the adhering rubber strip was placed in the oxygen absorption apparatus. The amount of oxygen absorbed in a particular interval of time was determined and recorded in the following table. This testing procedure is described in further detail in "Industrial and Engineering Chemistry," volume 43, p. 456 (1951) and "Industrial and Engineering Chemistry," volume 45, p. 392 (1953).

TABLE

| Antioxidant: Product of Example— | Hours to 1% oxygen at 90° C. |
|---|---|
| 1 | 760 |
| 8 | 588 |
| 2 | 860 |
| 3 | 745 |
| 4 | 764 |
| 7 | 860 |
| Control (no antioxidant) | 8 |

Having provided a complete description of the invention in such manner as to distinguish it from other inventions and from what is old, and having provided a description of the best mode contemplated of carrying out the invention, the scope of patent protection to be granted the invention is defined in the folowing claims.

What I claim is:

1. A reaction product prepared by (1) reacting a mixture comprising (A) at least one chloromethylated diphenyl oxide selected from the group consisting of monochloromethylated diphenyl oxide, dichloromethylated diphenyl oxide and trichloromethylated diphenyl oxide and (B) at least one mol per replaceable chlorine atom in the chloromethylated diphenyl oxide of a mono- or dihydric phenolic compound having at least two free positions from the ortho and para positions and wherein the substituents are selected from the group consisting of hydrogen, methyl, ethyl, isopropyl, t-butyl, chloro and methoxy; at a temperature of from 30° C. to 150° C. and (2) subsequently reacting the first formed product with at least one mol of a tertiary olefinic compound containing from 4 to 8 carbon atoms per mol of the first formed product in the presence of an acidic alkylation catalyst and at a temperature of from 30° C. to 100° C.

2. The reaction product prepared by the process of claim 1 wherein the first reaction is conducted in the presence of a catalytic amount of a Friedel-Crafts catalyst.

3. The reaction product according to claim 1 wherein the tertiary olefinic compound is isobutylene.

4. The reaction product according to claim 1 wherein the chloromethylated diphenyl oxide is dichloromethylated diphenyl oxide and wherein the phenolic compound is selected from the group consisting of phenol and p-cresol.

5. The reaction product according to claim 1 wherein the chloromethylated diphenyl oxide is trichloromethylated diphenyl oxide and wherein the phenolic compound is selected from the group consisting of phenol and p-cresol.

References Cited

UNITED STATES PATENTS

| 2,911,380 | 11/1959 | Doedens. | |
| 3,038,878 | 6/1962 | Bell et al. | 260—613 XR |
| 3,054,773 | 9/1962 | Wilgus | 260—613 XR |

FOREIGN PATENTS

| 1,217,309 | 12/1959 | France. |
| 1,092,026 | 11/1960 | Germany. |
| 962,682 | 7/1964 | Great Britain. |

BERNARD HELFIN, *Primary Examiner.*

U.S. Cl. X.R.

252—407; 44—77; 260—45.95